(12) United States Patent
Yoshida et al.

(10) Patent No.: US 9,502,940 B2
(45) Date of Patent: Nov. 22, 2016

(54) CONNECTION TERMINAL, CONNECTION TERMINAL UNIT, AND MOTOR

(71) Applicants: Kempei Yoshida, Tokyo (JP); Kosei Tsuji, Tokyo (JP)

(72) Inventors: Kempei Yoshida, Tokyo (JP); Kosei Tsuji, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/652,850

(22) PCT Filed: Feb. 7, 2013

(86) PCT No.: PCT/JP2013/052942
§ 371 (c)(1),
(2) Date: Jun. 17, 2015

(87) PCT Pub. No.: WO2014/122762
PCT Pub. Date: Aug. 14, 2014

(65) Prior Publication Data
US 2015/0333590 A1    Nov. 19, 2015

(51) Int. Cl.
*H02K 11/00* (2016.01)
*H02K 3/50* (2006.01)
*H02K 3/48* (2006.01)
*H02K 3/52* (2006.01)

(52) U.S. Cl.
CPC *H02K 3/50* (2013.01); *H02K 3/48* (2013.01); *H02K 3/522* (2013.01)

(58) Field of Classification Search
CPC ........... H02K 5/225; H02K 3/50; H02K 3/28
USPC ....................................... 310/71, 194, 254.1
See application file for complete search history.

(56) References Cited

U.S. PATENT DOCUMENTS

| 3,780,323 | A | * | 12/1973 | Swain | ..................... H02K 3/325 310/194 |
|---|---|---|---|---|---|
| 3,974,407 | A | | 8/1976 | Dochterman | |
| 3,979,615 | A | | 9/1976 | Neff | |
| 4,036,545 | A | | 7/1977 | Mysiak et al. | |

(Continued)

FOREIGN PATENT DOCUMENTS

| CN | 1106171 A | 8/1995 |
|---|---|---|
| EP | 0647984 | 4/1995 |

(Continued)

OTHER PUBLICATIONS

International Search Report for PCT/JP2013/052942 dated Apr. 23, 2013 [PCT/ISA/210].

(Continued)

*Primary Examiner* — Thanh Lam
(74) *Attorney, Agent, or Firm* — Sughrue Mion, PLLC; Richard C Turner

(57) ABSTRACT

An objective of the present invention is to provide a connection terminal in which the number of parts is reduced and a contact failure hardly occurs. A connection terminal is conducted to a windings wound around tooth of a stator having a cylindrical shape. The connection terminal includes an insertion part that is inserted in a concave part formed in the stator of a motor and a connection part that extends from the insertion part. In the insertion part, a contact part that comes into contact with an end part of the winding when the insertion part is inserted in the concave part, is formed. The insertion part and the connection part are integrally formed.

5 Claims, 9 Drawing Sheets

(56) References Cited

U.S. PATENT DOCUMENTS

| | | | | |
|---|---|---|---|---|
| 4,287,446 | A * | 9/1981 | Lill | .......................... H02K 3/28 310/71 |
| 7,109,618 | B2 * | 9/2006 | Cha | ....................... H01R 4/185 29/596 |
| 7,116,023 | B2 * | 10/2006 | Wang | ..................... H02K 1/148 310/194 |
| 2003/0173854 | A1 | 9/2003 | Oppitz | |
| 2005/0012413 | A1 * | 1/2005 | Bott | ....................... H02K 3/522 310/71 |
| 2008/0018193 | A1 | 1/2008 | Kobayashi | |
| 2012/0098380 | A1 * | 4/2012 | Wang | ..................... H02K 1/148 310/215 |

FOREIGN PATENT DOCUMENTS

| | | |
|---|---|---|
| EP | 1 521 349 A1 | 4/2005 |
| JP | 50-108593 A | 8/1975 |
| JP | 06-022486 A | 1/1994 |
| JP | 06-233483 A | 8/1994 |
| JP | 3583849 B2 | 8/1997 |
| JP | 09-247881 A | 9/1997 |
| JP | 09-312948 A | 12/1997 |
| JP | 2000-059705 A | 2/2000 |
| JP | 2000-069705 A | 3/2000 |
| JP | 2003-143793 A | 5/2003 |
| JP | 2004-064989 A | 2/2004 |
| JP | 2005-184959 A | 7/2005 |
| JP | 2007-267571 A | 10/2007 |
| WO | 2008/040890 A1 | 4/2008 |

OTHER PUBLICATIONS

Written Opinion for PCT/JP2013/052942 dated Apr. 23, 2013 [PCT/ISA/237].

Taiwanese Office Action for TW No. 102132383 dated Nov. 27, 2014.

Communication dated Mar. 8, 2016 from the Chinese Patent Office issued in corresponding Application No. 201380072346.6.

Communication dated Aug. 26, 2016 from the State Intellectual Property Office of the P.R.C. in counterpart application No. 201380072346.6.

* cited by examiner

CONNECTION TERMINAL, CONNECTION TERMINAL UNIT, AND MOTOR

CROSS REFERENCE TO RELATED APPLICATIONS

This application is a National Stage of International Application No. PCT/JP2013/052942 filed Feb. 7, 2013, the contents of all of which are incorporated herein by reference in their entirety.

FIELD

The present invention relates to a connection terminal, a connection terminal unit, and a motor.

BACKGROUND

A plurality of coils are provided in a stator of a motor. In the stator of the motor, a plurality of teeth are formed on an inner surface of a core back having a cylindrical shape. Windings are wound around the teeth to constitute a plurality of coils. In this type of motor, it is necessary to electrically connect windings that are wound around respectively different teeth.

With regard thereto, there is a case where windings wound around respectively different teeth are electrically connected to each other by providing connection terminals that are conducted to the windings and by further electrically connecting these connection terminals to each other. For example, Patent Literature 1 discloses a connection terminal including a female terminal that is inserted in a concave part formed in a coil so that it is conducted to windings and a male terminal that engages with the female terminal to enable electrical connection between windings.

CITATION LIST

Patent Literature

Patent Literature 1: Japanese Patent Application Laid-open No. 2007-267571

SUMMARY

Technical Problem

However, in the conventional technique described above, because connection terminals are separated into a male terminal and a female terminal, there are problems such as an increase in the number of parts and possibility of occurrence of a contact failure between the male terminal and the female terminal.

The present invention has been achieved in view of the above problems, and an object of the present invention is to provide a connection terminal in which the number of parts is reduced and a contact failure hardly occurs.

Solution to Problem

In order to solve the aforementioned problems, a connection terminal that is conducted to a winding wound around a tooth of a stator having a cylindrical shape according to one aspect of the present invention is constructed to include: an insertion part that is inserted in a concave part of the stator; and a connection part that extends from the insertion part, wherein in the insertion part, a contact part that comes into contact with the winding when the insertion part is inserted in the concave part is formed, and the insertion part and the connection part are integrally formed.

Advantageous Effects of Invention

According to the connection terminal of the present invention, the number of parts can be reduced and possibility of occurrence of a contact failure can be also reduced.

DESCRIPTION OF EMBODIMENTS

Exemplary embodiments of a connection terminal, a connection terminal unit, and a motor according to the present invention will be explained below in detail with reference to the accompanying drawings. The present invention is not limited to the embodiments.

First Embodiment.

Figure 1:
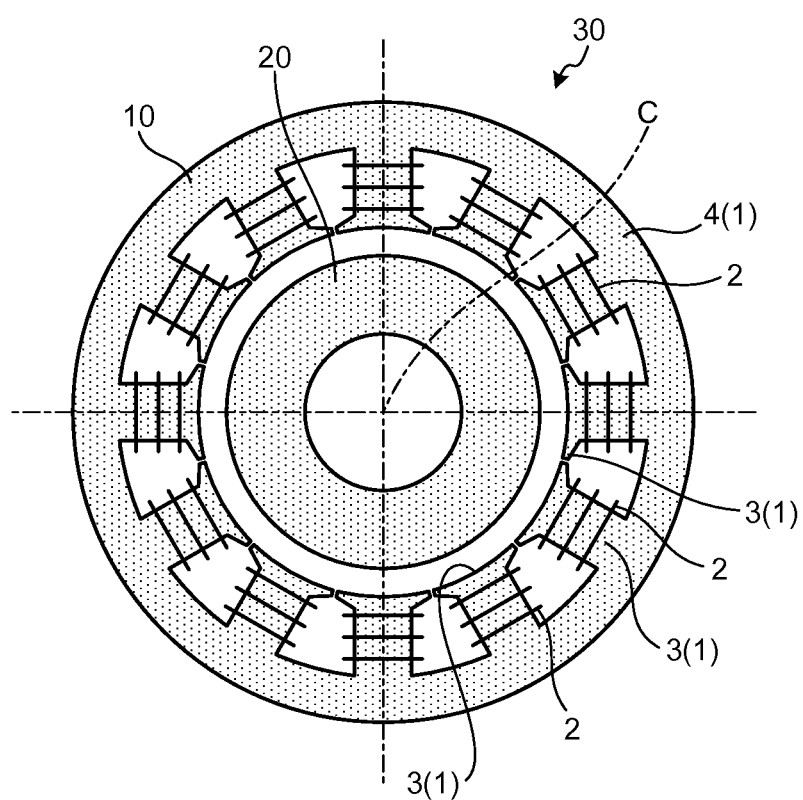
FIG. 1 is a diagram schematically illustrating an internal configuration of a motor according to a first embodiment of the present invention, as viewed along a rotation axis direction.

FIG. 1 is a diagram schematically illustrating an internal configuration of a motor according to a first embodiment of the present invention, as viewed along the rotation axis direction. A motor 30 includes a stator 10 and a rotor 20. The rotor 20 is provided on the inner side of the stator 10 and is configured to be rotatable around a rotation axis (a central axis C).

Figure 2:
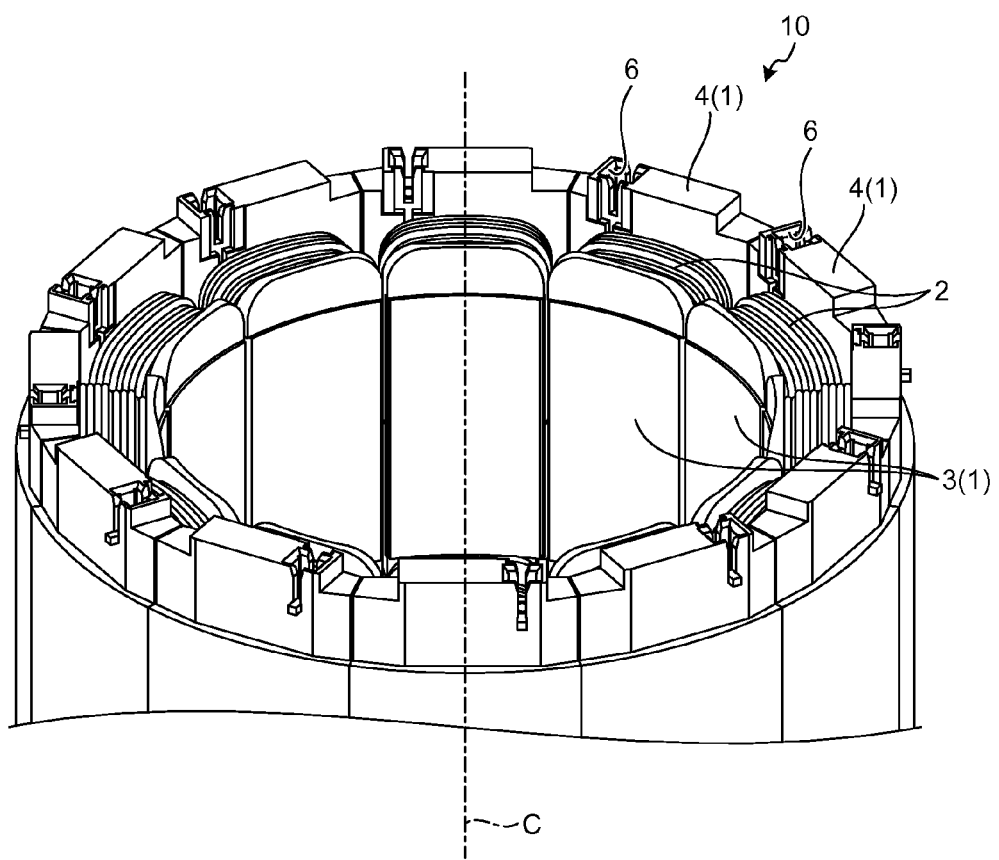
FIG. 2 is a partially enlarged perspective view in which an end part of a stator is enlarged.

FIG. 2 is a partially enlarged perspective view in which an end part of the stator 10 is enlarged. The stator 10 includes a stator core 1 and windings 2. The stator core 1 includes a plurality of core backs 4 and teeth 3. The stator core 1 is formed by stacking metallic thin plates made of, for example, iron. The core backs 4 form a cylindrical shape as a whole. The central axis C of the core backs 4 having a cylindrical shape overlaps on the rotation axis of the rotor 20.

Each of the teeth 3 (hereinafter may be referred to as a "tooth") is formed to protrude from an inner surface of each of the core backs 4 to the central axis C and to extend along the extending direction of the central axis C. The plurality of teeth 3 are formed respectively on the inner surface of the core backs 4. Each of the windings 2 is wound around the tooth 3 to form a coil. The winding 2 is, for example, an insulation-coated copper wire. The motor 30 is a three-phase motor in which each of the windings 2 wound around the tooth 3 functions as a coil of any one of a U phase, a V phase, or a W phase.

Figure 3:
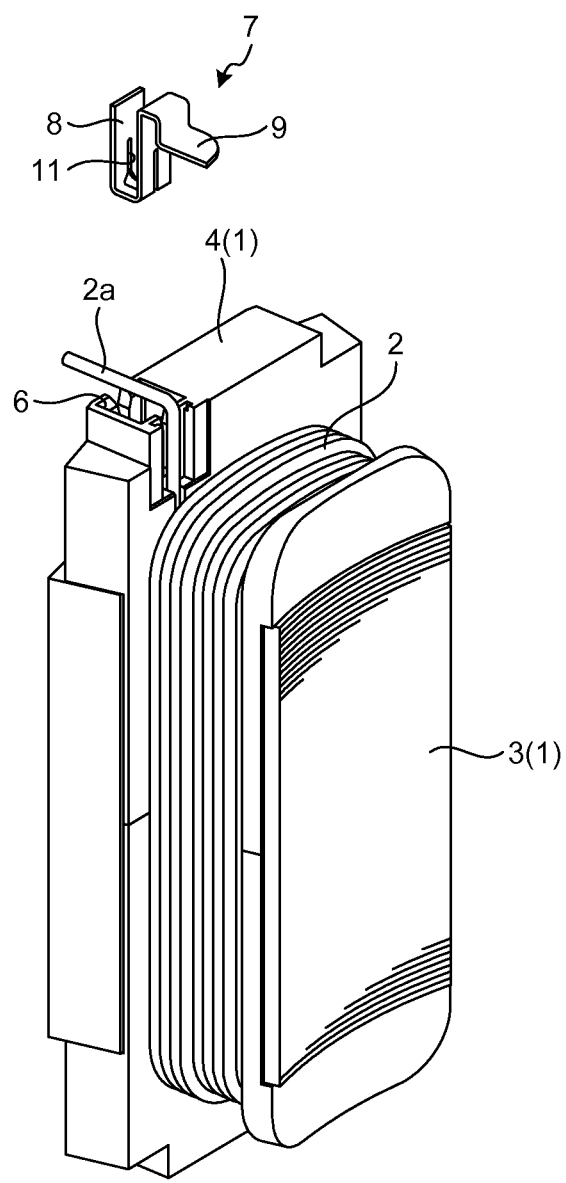
FIG. 3 is a perspective view in which one of teeth included in the stator is enlarged.

FIG. 3 is a perspective view in which one of the teeth (a teeth) included in the stator 10 is enlarged. A concave part 6 is formed in the core back 4 provided adjacent to the tooth 3. An end part 2a of the windings 2 which are wound around the teeth 3 passes through a position where the end part 2a overlaps on an opening of the concave part 6. A connection terminal 7 that is conducted to the end part 2a of the winding 2 is inserted in the concave part 6.

Figure 4:
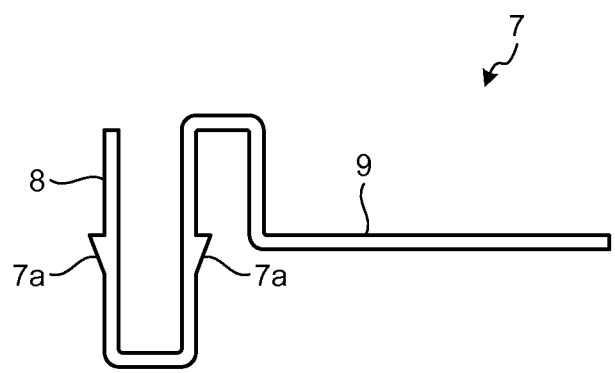
FIG. 4 is a side view of a connection terminal.
Figure 5:
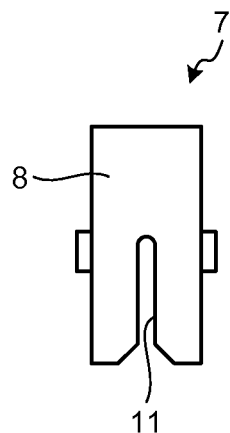
FIG. 5 is a front view of the connection terminal.
Figure 6:
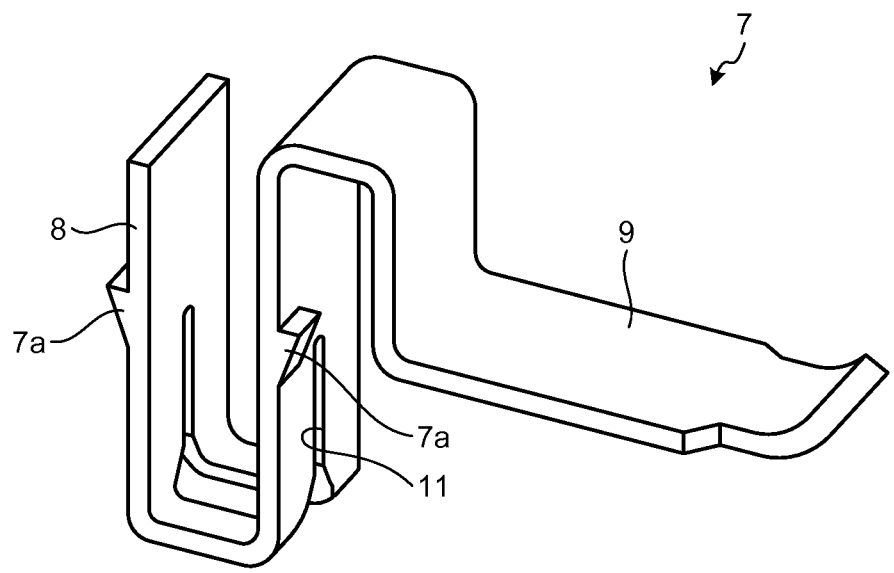
FIG. 6 is a perspective view of the connection terminal.

FIG. 4 is a side view of the connection terminal 7. FIG. 5 is a front view of the connection terminal 7. FIG. 6 is a perspective view of the connection terminal 7. The connection terminal 7 is formed of, for example, a conductive metallic material. The connection terminal 7 includes an insertion part 8 and a connection part 9. The insertion part 8 and the connection part 9 are integrally formed. The insertion part 8 can be inserted in the concave part 6. By inserting the insertion part 8 in the concave part 6, the insertion part 8 is fitted in the concave part 6, thereby fixing the connection terminal 7 to the core back 4.

A groove (contact part) 11 extending in an insertion direction is formed in the insertion part 8. The width of the groove 11 is formed to be narrower than the outer diameter of the winding 2. The end part 2a of the winding 2 is put into the groove 11 when the insertion part 8 is inserted in the concave part 6. Because the width of the groove 11 is formed to be narrower than the outer diameter of the windings 2, when the end part 2a is put into the groove 11, a coating of the winding 2 is removed by the groove 11. Due to this configuration, internal wire of the winding 2 and the insertion part 8 comes into contact with each other, thereby electrically connecting the connection terminal 7 and the winding 2.

The connection part 9 is formed integrally with the insertion part 8 so as to extend from the insertion part 8. By electrically connecting the connection parts 9 to each other with a wire such as a copper wire, windings 2 that are wound around respectively different teeth 3, such as windings 2 that become coils of respectively the same phase or windings 2 that become coils of respectively different phases, are electrically connected to each other.

Figure 7:
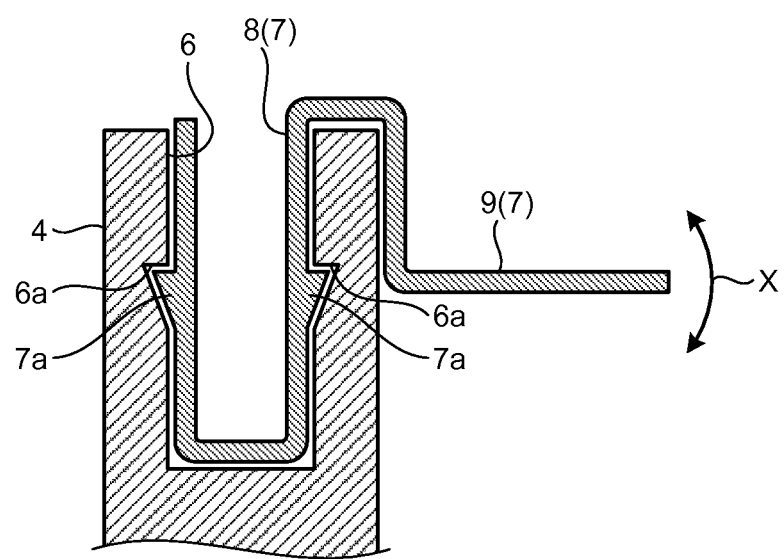
FIG. 7 is a partially enlarged sectional view in which a concave part in which the connection terminal is inserted is enlarged.

FIG. 7 is a partially enlarged sectional view in which the concave part 6 in which the connection terminal 7 is inserted is enlarged. In the insertion part 8, protrusions 7a protruding to a radial direction side of the stator 10 having a cylindrical shape are formed. Engagement holes 6a that engage with the protrusions 7a are formed inside the concave part 6. Because the protrusions 7a protruding to a radial direction engage with the engagement holes 6a, it is possible to prevent the connection terminal 7 from coming off from the concave part 6 and also to prevent the connection terminal 7 from moving in the directions indicated by an arrow X.

Movement of the connection terminal 7 in the directions indicated by the arrow X tends to become large movement of the connection part 9 that is apart from the concave part 6. When the connection part 9 largely moves, a contact failure between the connection terminal 7 and wires or the like joined to the connection part 9 tends to occur. In the present embodiment, because movement of the connection terminal 7 in the directions indicated by the arrow X is prevented by the protrusions 7a and the engagement holes 6a, occurrence of a contact failure can be prevented and thus improvement of reliability of products can be achieved.

Further, because the insertion part 8 and the connection part 9 are integrally formed, as compared to a case where the insertion part 8 and the connection part 9 are formed separately, cost reduction due to reduction of the number of parts can be achieved. Furthermore, as the number of contact points is reduced, occurrence of a contact failure can be suppressed and thus improvement of reliability can be achieved.

Second Embodiment.

Figure 8:
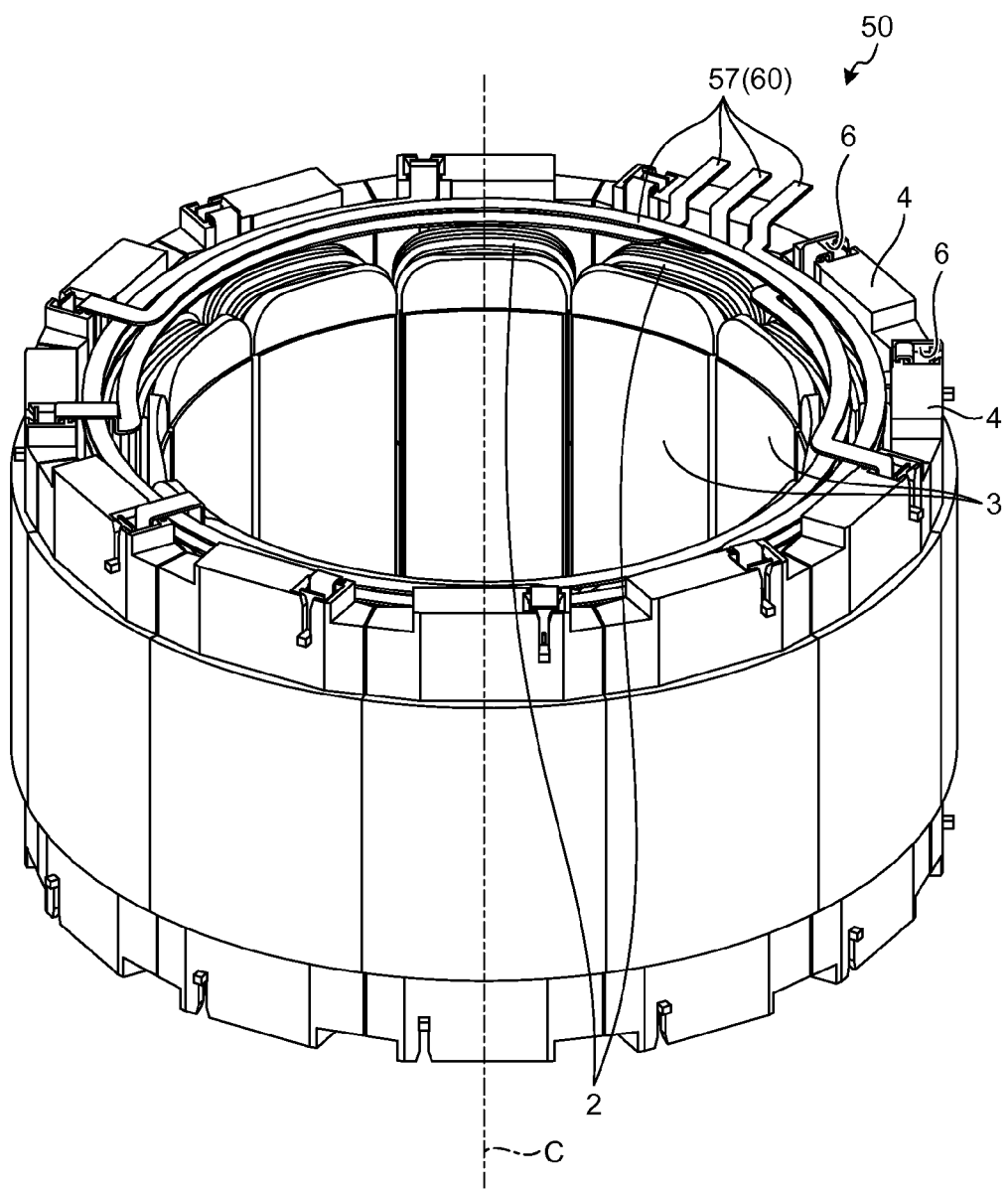
FIG. 8 is a perspective view of a stator included in a motor according to a second embodiment of the present invention.
Figure 9:
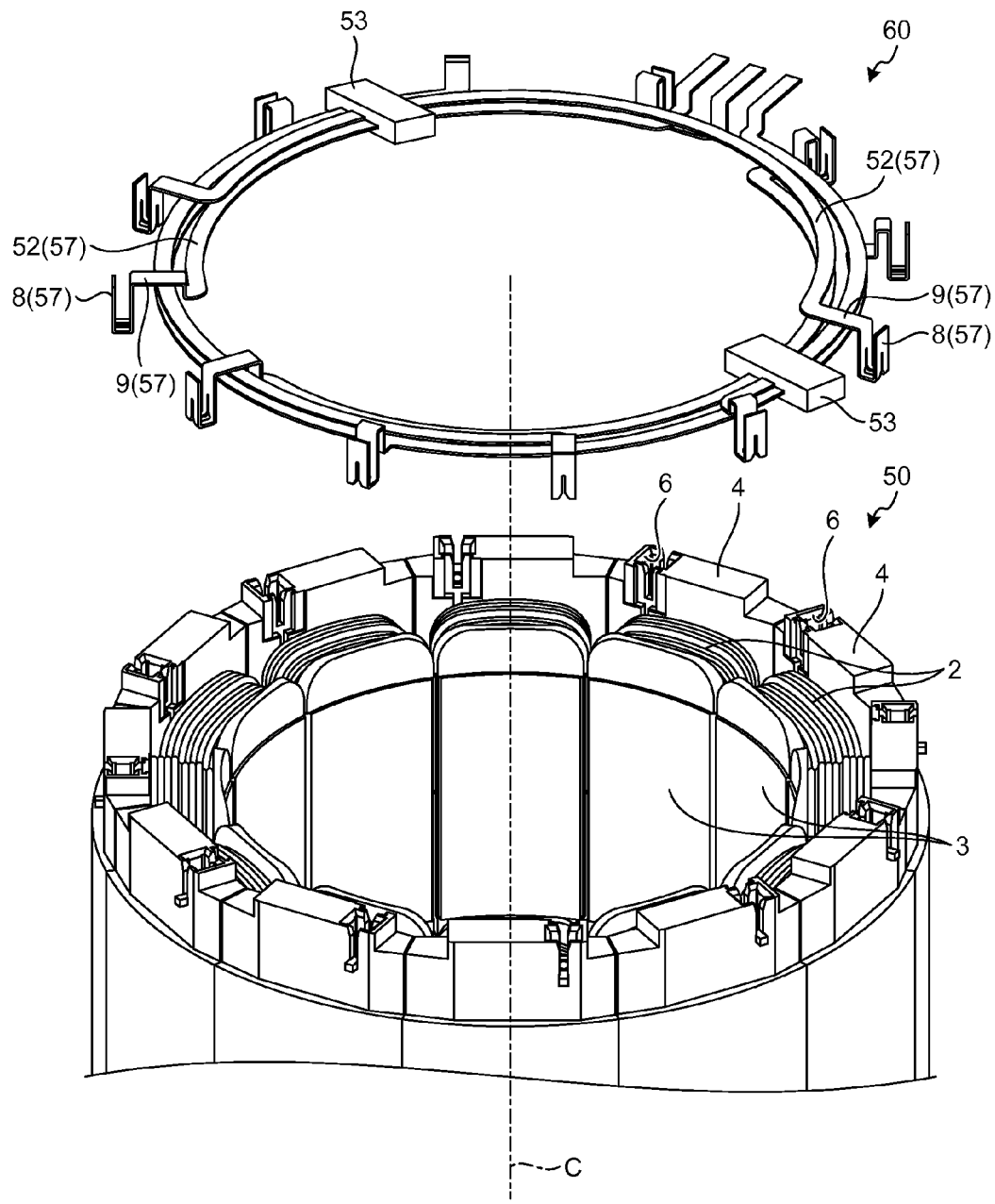
FIG. 9 is a diagram in which an end part of the stator is enlarged, and is an exploded perspective view illustrating a state where a connection terminal unit is exploded.
Figure 10:
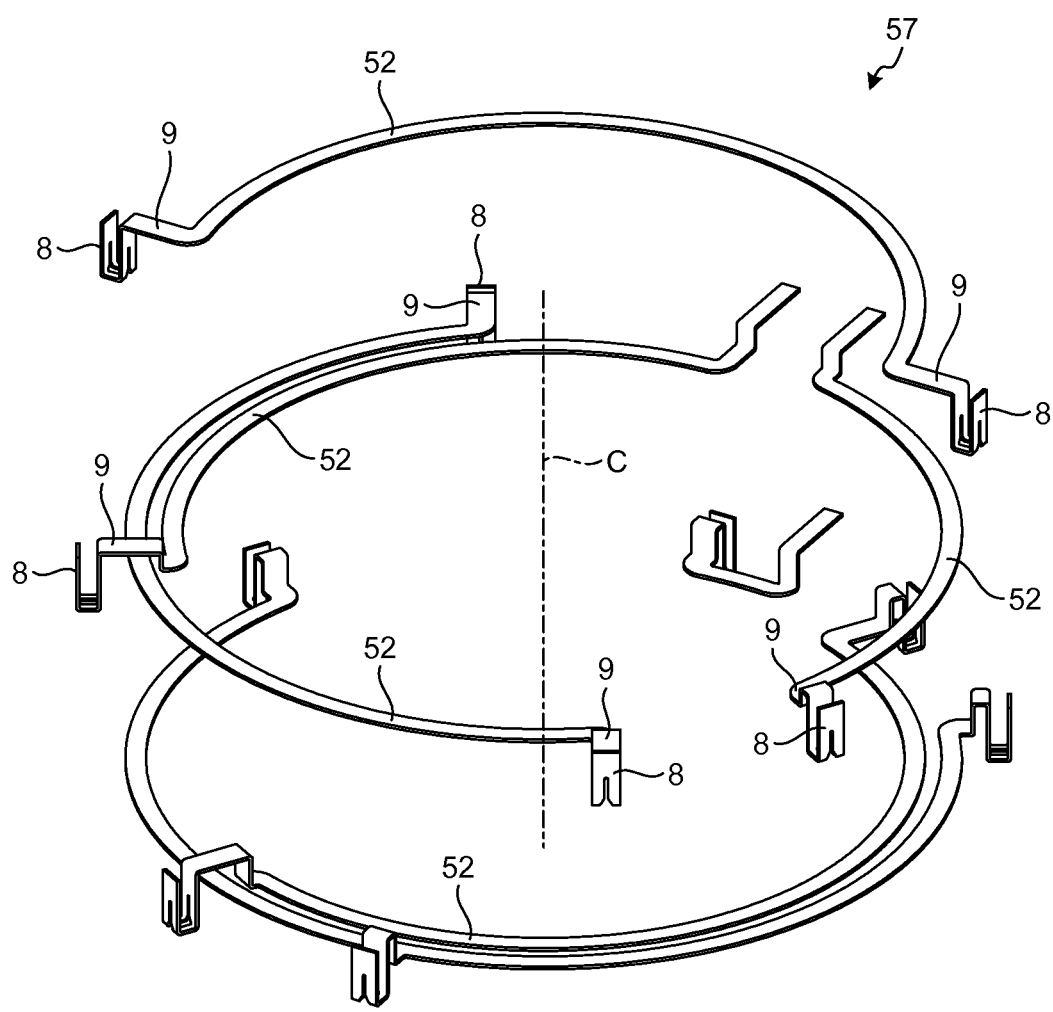
FIG. 10 is an exploded perspective view of the connection terminal unit.

FIG. 8 is a perspective view of a stator included in a motor according to a second embodiment of the present invention. FIG. 9 is a diagram in which an end part of the stator is enlarged, and is an exploded perspective view illustrating a state where a connection terminal unit is exploded. FIG. 10 is an exploded perspective view of the connection terminal unit. Constituent elements identical to those of the above embodiment are denoted by like reference signs and detailed explanations thereof will be omitted.

A connection terminal unit 60 in which a plurality of connection terminals 57 are held is attached to a stator 50 included in the motor according to the second embodiment. As illustrated in FIG. 10, the connection terminal 57 includes insertion parts 8, connection parts 9, and a plate part 52. The plate part 52 is a plate like member extending from the connection parts 9 and has a shape of an arc around the central axis C of the stator 50. The insertion parts 8, the connection parts 9, and the plate parts 52 are integrally formed.

Among the connection terminals 57, there are terminals in which one insertion part 8 and one connection part 9 are provided on an end part of one plate part 52, and terminals in which a plurality of insertion parts 8 and a plurality of connection parts 9 are provided on one plate part 52. The plate part 52 on which one insertion part 8 and one connection part 9 are provided functions as an input terminal to which power to be transmitted from one end thereof to the winding 2 is input. The plate part 52 on which the plurality of insertion parts 8 and the plurality of connection parts 9 are provided causes the windings 2 respectively wound around different teeth 3 to be electrically connected to each other. For example, the plate part 52 on which the plurality of insertion parts 8 and the plurality of connection parts 9 are provided causes windings 2 that become coils of respectively the same phase to be connected to each other, and causes windings 2 that become coils of respectively different phases to be electrically connected to each other.

As for windings 2 that become coils of respectively the same phase and that are not electrically connected to each other with the connection terminal 57, these windings 2 are electrically connected to each other by, for example, being constituted with one copper wire. The insertion parts 8 and the connection parts 9 are provided on an outer periphery side of the plate part 52 having an arc shape, and the plate part 52 overlaps on the teeth 3 as viewed along the central axis C.

Figure 11:
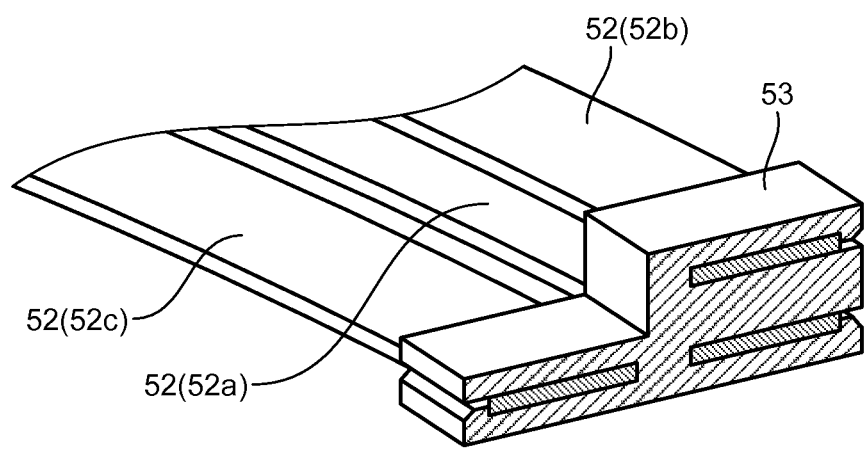
FIG. 11 is a partially enlarged perspective view in which, in the connection terminal unit, a part of the connection terminal unit being held by an insulative holding unit is enlarged.

As illustrated in FIG. 9, the connection terminals 57 described above are held together in an insulative holding unit 53, thereby constituting the connection terminal unit 60. FIG. 11 is a partially enlarged perspective view in which, in the connection terminal unit 60, a part thereof that is held by the insulative holding unit 53 is enlarged. The insulative holding unit 53 is formed of an insulative material, such as synthetic resin. The insulative holding unit 53 holds, with respect to the plate part 52 (52a) of one connection terminal 57, another plate part 52 (52b) of another connection terminal 57, with a space in a direction along the central axis C (see also FIG. 8 and the like). Furthermore, the insulative holding unit 53 holds, with respect to the plate part 52 (52a) of one connection terminal 57, another plate part 52 (52c) of still another connection terminal 57 with a space in the radial direction of a cylindrical shape.

In the connection terminal unit 60, because the insertion parts 8 are coupled to each other by the plate part 52 having a plate shape and the plurality of connection terminals 57 are held by the insulative holding unit 53, positions of the insertion parts 8 can be decided in advance. Furthermore, because the insertion parts 8 are coupled to each other by the plate part 52 having a plate shape, as compared to a case where insertion parts are coupled to each other by a wire that tends to deform, it is less likely that the shape of the connection terminal unit 60 deforms.

Therefore, if the connection terminal unit 60 is assembled in advance in such a manner that the positions of the concave parts 6 and those of the insertion parts 8 are overlapped on each other, by attaching the connection terminal unit 60 to the stator 50, all the insertion parts 8 can be collectively inserted in the concave parts 6. Due to this configuration, assembly of a motor can be facilitated.

Further, due to the presence of the insulative holding unit 53, there is a fixed space between the plate parts 52, and thus the plate parts 52 hardly come into contact with each other. Therefore, it is possible to eliminate insulation processing, such as covering the surfaces of the plate parts 52 with an insulative cover. Due to this configuration, reduction of manufacturing cost can be made.

In the connection terminal 57, the insertion part 8 and the connection part 9 are provided on an outer periphery side of the plate parts 52 having an arc shape, and the plate part 52 overlaps on the teeth 3 as viewed along the central axis C, so that a dead space on the teeth 3 can be effectively utilized. Due to this configuration, downsizing of a motor can be achieved.

In the connection terminal unit 60, a plurality of plate parts 52 are respectively provided in the direction of the central axis C and the radial direction with respect to the plate part 52 of one connection terminals 57. Therefore, as compared to a case where plate parts 52 are respectively provided only in one direction, it is possible to save the space for providing the connection terminal 57. Due to this configuration, further downsizing of a motor can be achieved.

Even if the plate parts 52 are respectively provided only in one direction, for example, only in a radial direction, as far as a fixed space is provided between the plate parts 52, as described above, it is made possible to obtain an effect that insulation processing can be eliminated.

INDUSTRIAL APPLICABILITY

As described above, the connection terminal according to the present invention is useful when using it as a connection terminal that electrically connects windings of a stator.

REFERENCE SIGNS LIST 1 stator core, 2 winding, 2a end part, 3 teeth, 4 core back, 6 concave part, 6a engagement hole, connection terminal, 7a protrusion, 8 insertion part, connection part, 10 stator, 11 groove (contact part), rotor, 30 motor, 50 stator, 52, 52a, 52b, 52c plate part, 53 insulative holding unit, 57 connection terminal, 60 connection terminal unit.

The invention claimed is:

1. A connection terminal that is conducted to a winding wound around a tooth of a stator having a cylindrical shape, the connection terminal comprising:
    an insertion part that is inserted in a concave part of the stator; and
    a connection part that extends from the insertion part, wherein
    the insertion part is formed with a contact part that comes into contact with the winding when the insertion part is inserted in the concave part,
    the insertion part has a sectional surface of a U-shape,
    the contact part is a groove that is formed from a closing side to an opening side of the U-shape,
    the insertion part is further formed with protrusions that protrude in a radial direction of the cylindrical shape, and engage with engagement holes that are formed in the concave part, and
    the insertion part and the connection part are integrally formed.

2. The connection terminal according to claim 1, further comprising:
    a plurality of the insertion parts and a plurality of the connection parts that extend from the insertion parts; and
    a plate part that is a plate member having a shape of an arc around a central axis of the cylindrical shape, and connects the connection parts to each other.

3. The connection terminal according to claim 2, wherein the insertion parts and the connection parts are formed on an outer periphery side of the plate part.

4. A connection terminal unit comprising:
    the connection terminal according to claim 2, where the connection terminal is provided in plural for three phases; and
    an insulative holding unit that holds, with respect to the plate part of one of the connection terminals among the connection terminals for three phases, the plate part of another one of the connection terminals, with a space in a direction along the central axis, and holds, with respect to the plate part of the one of the connection terminals, the plate part of still another one of the connection terminals, with a space in a radial direction of the cylindrical shape.

5. A motor comprising:
    the connection terminal unit according to claim 4;
    a stator having a concave part in which an insertion part of the connection terminal is inserted formed therein, and having a cylindrical shape; and
    a rotor that is provided inside the stator.

* * * * *